Patented Dec. 22, 1925.

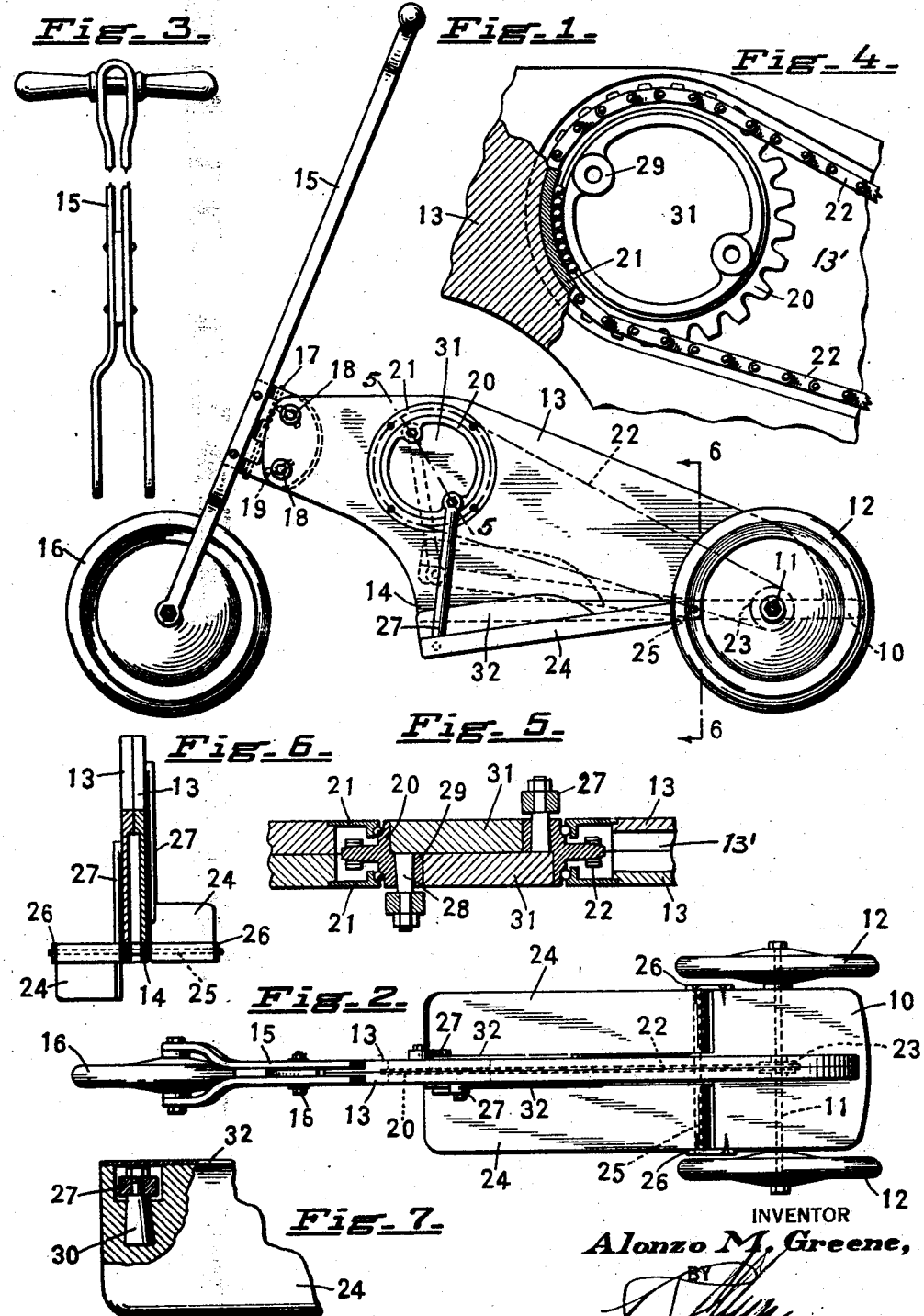

1,566,669

UNITED STATES PATENT OFFICE.

ALONZO M. GREENE, OF NEW LONDON, CONNECTICUT.

TREADLE-OPERATED VEHICLE.

Application filed December 29, 1922. Serial No. 609,567.

*To all whom it may concern:*

Be it known that I, ALONZO M. GREENE, a citizen of the United States of America, and residing at New London, in the county of New London and State of Connecticut, have invented new and useful Improvements in Treadle-Operated Vehicles, of which the following is a specification.

My invention relates particularly to improvements in constructions of the character of my former application No. 522,373. The main object is to provide a construction which can be readily and economically made and easily driven. Another object is to so construct and arrange the parts that the rider is unlikely to be injured by contact with the propelling mechanism. Another object is to construct the device so that it may be tilted up and pushed along on the rear wheels. Another object is to provide for the angular adjustment of the steering rod and front wheel. Another object is to facilitate the turning movement of the vehicle.

Fig. 1 is a side view of one form of the vehicle embodying the improvements of my invention.

Fig. 2 is a plan view of the same, the steering column or fork being broken away.

Fig. 3 is a front view of the steering column or rod.

Fig. 4 is a fragmentary view showing the main driving sprocket in the body.

Fig. 5 is a fragmentary horizontal sectional view showing the main driving sprocket and method of supporting the same, the section being taken on the plane of the line 5—5 of Fig. 1.

Fig. 6 is a vertical sectional view of the body on the plane of the line 6—6 of Fig. 1.

Fig. 7 is a plan view and fragmentary section showing the connection between the connecting rod and its treadle.

The platform 10 at the rear supports the main shaft 11 which has the wheels 12—12, one of which is secured to and rotates with the shaft and the other of which turns loosely upon it.

The body consists preferably of two boards 13—13 secured together and attached to the top of the platform adjacent the wheels. Preferably the platform also has a narrow central extension member 14 (Fig. 6) integral with it and extending along beneath and secured to the under side of the body in front of the wheels. The steering column or fork 15 may be conveniently formed of a bar bent in the middle to support a cross bar and forked at its lower end to embrace the front wheel 16. This front steering column or fork may be conveniently secured to the body so as to permit steering. In the drawing I have shown a hinge 17 having one member secured to the steering column and the other member clamped between the sides 13—13 of the body by means of bolts 18—18. The hinge member may have slots 19 permitting angular adjustment of the steering column to accommodate the rider. The platform 10 is preferably made short enough so as to permit the vehicle to be tilted up and trundled along on its rear wheels without interference.

The sprocket or crank member 20 is mounted in an opening 13′ in the body and is preferably supported by ball bearings in the rings 21—21 secured to opposite sides of the body. This sprocket member is connected by chain 22 to the sprocket 23 on the rear shaft or axle. The treadles 24—24 are pivoted on opposite sides of the body, for instance by means of a rod 25 which passes through the extension 14 just in front of the edge of the main portion of the platform 10 and on approximately the same plane as the platform. The opposite ends of this pivot rod or hinge member 25 are preferably supported and reinforced by strips 26 which are secured to the side edges of the platform 10 and to the ends of the rod 25 in any suitable manner as for instance by screws which extend into the edges of the platform 10 and into the ends of the rod 25 respectively as shown in Fig. 2. The crank or sprocket member 20 is secured to the opposite treadles by means for instance of connecting rods 27 so that the crank or sprocket member 20 is rotated as the treadles are alternately oscillated. The upper end of the connecting rod 27 may conveniently be secured to the sprocket member, for instance by means of a tapered bearing pin 28 journalled in a lug 29 so as to facilitate construction and operation. The lower end of each connecting rod may be connected to the front inner end of its treadle by means of stud 30. The opening in the sprocket member 20 may be filled for instance with disks of wood 31 so as to prevent the hands or feet from being inserted therethrough. Guard plates 32 are also preferably provided for preventing the feet from slipping inwardly under the body as the treadles move down. These guard plates may conveniently be fastened to the treadles.

It will be seen that this construction can be ridden in the same way that toy vehicles known as scooters are ridden, the rider standing with one foot on the platform 10 and pushing the vehicle along with the other foot. Obviously the rider can also coast along on this vehicle with both feet on the platform 10. When the rider wishes to apply power to the treadles it is simply necessary to step forward slightly on to the treadles which are operated more or less automatically by the rider changing his weight from one side to the other.

The parts are so constructed and proportioned that there is little danger of the rider sticking his toes in between the connecting rod and the body or otherwise getting jammed. This is a particularly important feature in view of the fact that children frequently wish to ride without shoes.

By leaving one of the rear wheels loose on the shaft it is easier for the rider to turn the vehicle, and the necessity for a differential mechanism is avoided. The wheels are all preferably of one size so that they can be readily interchanged and thus distribute the wear more or less uniformly.

I claim:

1. In a vehicle, a flat vertically disposed body, treadles pivoted at opposite sides thereof, bearing rings secured at opposite sides of said body, a rotatable member supported in said body by said bearing rings, links connecting said treadles and said rotatable member, a shaft mounted near the rear of said body, and a driving connection in said body between said rotatable member and said shaft.

2. In a vehicle, a platform having a central extension, a shaft and wheels carried by said platform, treadles pivoted to said platform, a body formed of two boards secured edgewise on said extension, a steering rod and wheel secured to the front end of said body, and a crank member rotatable in said body, and connected to said shaft and to said treadles.

3. In a vehicle, a body formed of two boards with a recess between them, a main shaft mounted at the lower rear part thereof and having a sprocket member, wheels on said shaft, a combined sprocket and crank member mounted in said body, and a drive chain connection between said sprocket members and located in said recess.

4. In a vehicle, a central body, a crank member rotatable therein, treadles pivoted at the sides of said body and moveable up and down alongside thereof, rods connecting said treadles and said crank member and guard plates secured to said treadles and always overlapping the body to prevent the toes from slipping under the lower edge of the body.

5. In a vehicle, a body, a sprocket member rotatable entirely therein and having only crank pins projecting therefrom, treadles pivoted at the rear of said body, and connecting rods secured to said crank pins close to the surface of said body and secured to the inner front ends of said treadles, a rear drive shaft having a sprocket and a chain housed in said body and connecting said sprockets.

6. In a vehicle, a platform, a vertical body secured thereto, a transverse shaft supported at its center and at its outer ends by said body, treadles pivoted on said shaft on opposite sides of said body, a crank member rotatably supported in said body, a rear shaft driven thereby, and links connecting said treadles and said crank member.

7. In a vehicle, a body, bearing rings secured to opposite faces thereof, a sprocket member rotatable in said rings and having crank pins, treadles pivoted to said body and connected to said crank pins and a main shaft connected to said sprocket member.

8. In a vehicle, a body formed of two boards, a sprocket member rotatably supported between said boards and having projecting crank pins, a main shaft having a sprocket, a chain on said sprockets between said boards, treadles pivoted to said body and connected to the crank pins of said sprocket member.

9. In a vehicle, a vertically disposed body, a platform secured to the rear of said body and extending on opposite sides thereof, rear wheels rotatably supported on opposite sides of said platform, the rear edges of said wheels extending beyond the rear edge of said platform, a steering wheel secured to the front end of said body, treadles supported on opposite sides of said body, a crank member rotatably mounted in said body and connected to said treadles, and a chain within said body connecting said crank member and one of the rear wheels.

ALONZO M. GREENE.